Patented Nov. 2, 1948

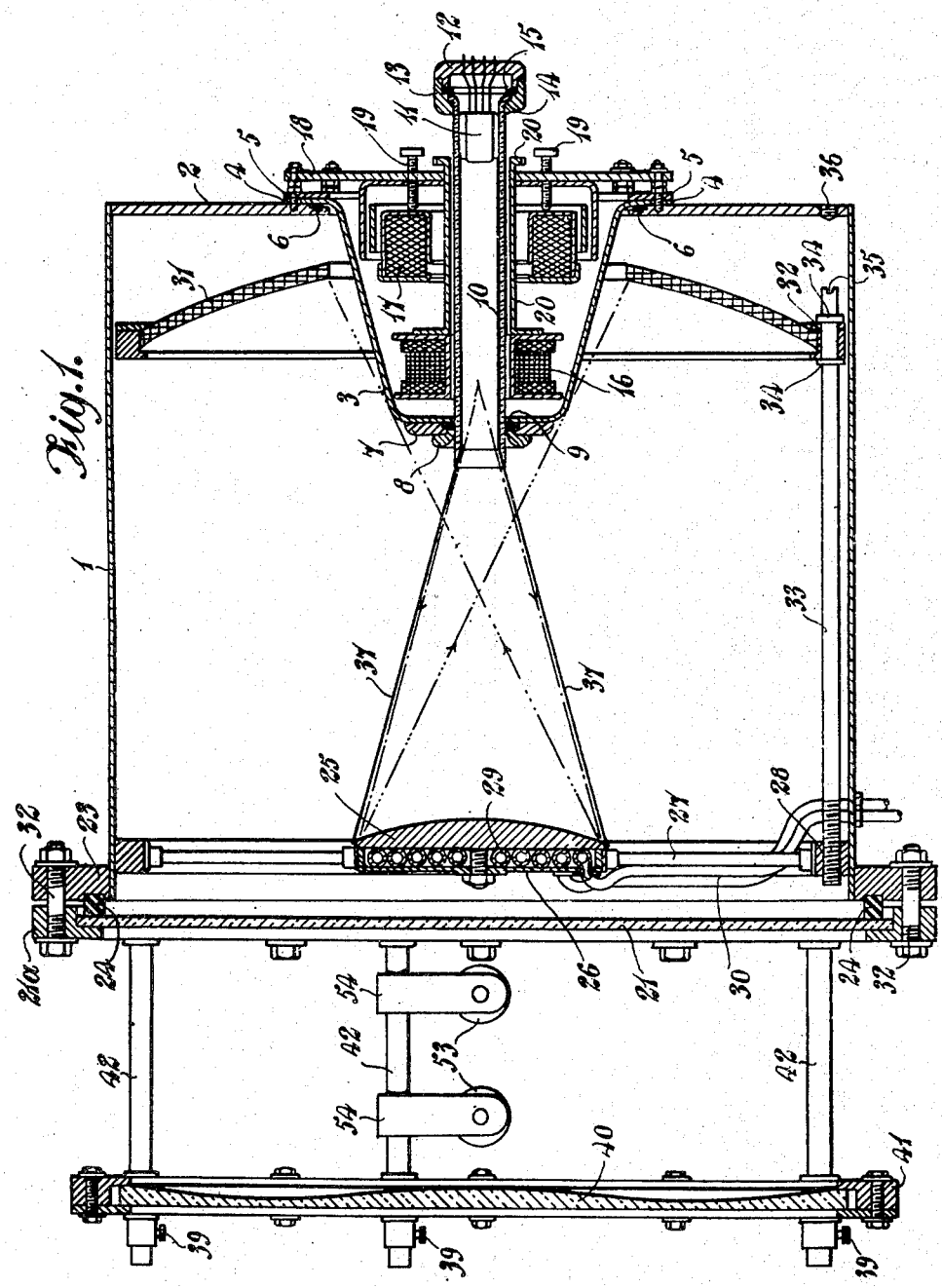

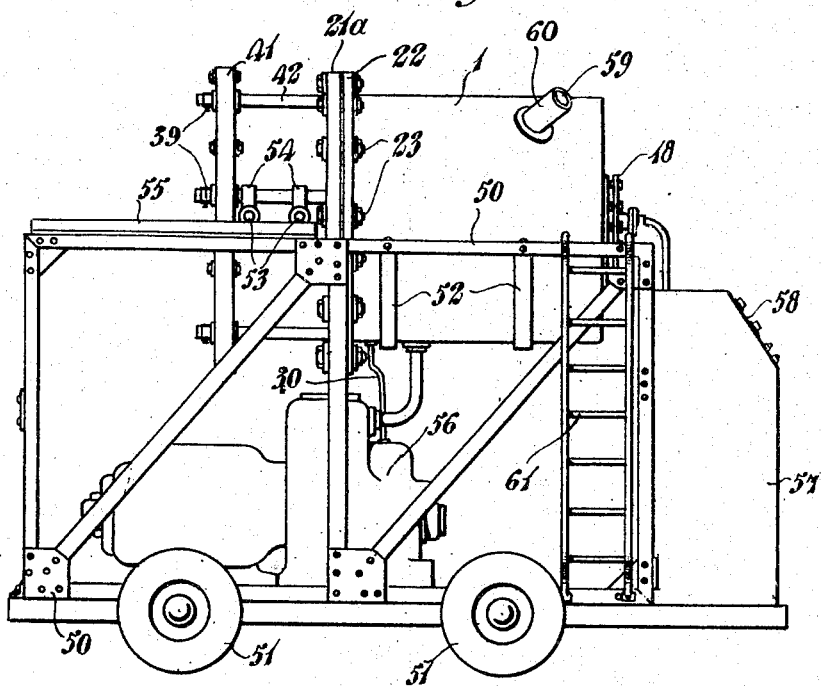

2,453,003

UNITED STATES PATENT OFFICE 2,453,003

TELEVISION PROJECTION TUBE

Baden John Edwards, Cambridge, England, assignor to Pye Limited, Cambridge, England, a British company Application March 20, 1947, Serial No. 735,894
In Great Britain March 7, 1946

13 Claims. (Cl. 178—7.5)

The present invention relates to a picture projection tube, particularly for television. It is known to arrange a cathode ray tube in front of a Schmidt lens so that the light from the front of the fluorescent screen, after reflection from the Schmidt lens and passing through a thin correcting lens, is projected on to a large screen. It is also known to arrange the cathode ray tube in the opposite direction, that is with its neck passing through an aperture in the centre of the Schmidt lens so that the light reflected by the Schmidt lens is that received from the back of the fluorescent screen. This has the advantage that a brighter picture is obtained since the light obtained from the back of the screen is brighter than that from the front, but the arrangement has the disadvantage that the light from the fluorescent screen has to pass through the curved back of the bulb of the tube, which gives rise to distortion in the picture unless the glass on these curved back walls is optically perfect.

The present invention has for its object to provide a picture projection tube in which the spherical mirror of the Schmidt lens is formed on the rear wall of the cathode ray tube or is positioned in the tube itself. A thin correcting lens may be arranged either within or in front of the tube envelope.

We have found that, for optimum results for beam focussing and also optical focussing, the distance from the spherical mirror of the Schmidt lens to the fluorescent screen should be approximately the same as the distance from the screen to the deflecting and focussing coils, and that these two distances should be of the order of the diameter of the screen. To this end, according to one feature of the invention, the aperture of the mirror positioned within the tube envelope is made sufficiently large to accommodate the deflecting coil, and preferably also the focussing coil, which is/are positioned substantially in the plane of the spherical mirror.

For ease of assembly and adjustment, the deflecting and focussing coils are preferably arranged outside the tube envelope, and from another aspect the invention also consists in a picture projection tube having the spherical mirror of a Schmidt lens positioned within the evacuated envelope of the tube, wherein the envelope is formed with a re-entrant portion which passes through the aperture in the centre of the mirror, and a neck portion which extends outwardly from the inner end of the re-entrant portion, the gun being located within the neck portion around which are disposed the focussing and deflecting coils. By this re-entrant construction the deflecting and focussing coils can be adjusted from outside the envelope along the neck portion and to either one side or the other of the plane of the centre of the mirror. The construction enables the beam focussing and deflecting elements to be situated in the optimum position for electron beam focussing and also enables the optical focussing to be optimum.

A further feature of the invention consists in spacing the fluorescent screen and the mirror by means which are separate from the tube envelope. In this way the spacing of the screen and mirror is not affected by vacuum shrinkage of the envelope upon the latter being evacuated. The spacing means also preferably comprise members having an extremely low coefficient of expansion, for example they may comprise Invar struts, to avoid variation of the spacing due to temperature variations. In the preferred construction, the fluorescent screen is carried by a spider from the envelope, Invar rods carried by the spider extending axially of the tube for supporting the mirror. Means may be provided for adjusting the spacing between the screen and the mirror for obtaining optical focus, for example by screw adjusting means at the ends of the Invar rods. The envelope preferably comprises a tubular metallic member closed at the screen end by a transparent plate and at the opposite end by a metal member having a re-entrant portion which passes through the central aperture of the spherical mirror and from which outwardly extends the neck portion accommodating the cathode ray gun and around which the deflecting and focussing coils are mounted. The neck portion may be made of glass. The correcting plate may be supported in front of the tube.

A still further feature of the invention consists in electrically connecting the conducting backing of the screen to the gun. This may be effected by a plurality of thin conducting wires extending from spaced points around the periphery of the screen to the final anode of the gun in the form of a conical grid. The wires should be sufficiently spaced to avoid, as much as possible, intercepting the light to be reflected from the screen and mirror and may, either converge from the screen to the gun or may diverge from the screen around the external periphery of the mirror and then lead to the gun. In this way the gun may be connected to earth and the modulating potentials may be applied thereto through a condenser which does not have to withstand the high voltages applied to the tube.

In order that the invention may be more clearly understood reference will now be made to the accompanying drawings, in which:

Fig. 1 shows a section through a picture projection tube according to the invention.

Fig. 2 shows a side elevation of a complete projection apparatus embodying the projection tube according to this invention.

Referring to Fig. 1 the tube envelope comprises a metal cylinder 1 which is closed at its rear end by a metal wall 2 through an aperture in the centre of which projects a re-entrant coned metal member 3. The outer end of this re-entrant member 3 is provided with a flange 4 which is secured to the surface of the rear wall 2 by a series of stud bolts and nuts 5, the joint between this flange and the rear wall 2 being sealed by a circular gasket 6.

The inner end of the re-entrant member 3 is also provided with an inwardly turned flange upon which is secured a relatively thick metal ring 7 provided with a threaded aperture at its centre into which is screwed a gland nut 8, a sealing gasket 9 being interpositioned between these two members to afford a vacuumtight seal around the glass tube 10 which projects rearwardly from the inner end of the re-entrant portion and accommodates the cathode ray gun 11 therein adjacent its extreme rear end which lies outside the back wall 2. The gun 11 is preferably arranged so as to be demountable from the glass tube 10, being, for example, secured to the end thereof by a member 12 which screws into an internally threaded ring 13 surrounding the end of the glass tube 10 which is outwardly flanged at 14, a sealing gasket 15 being clamped therebetween to provide a vacuumtight seal.

Surrounding the glass tube 10 are the deflecting coils 16 and the focussing coil 17, which latter is conveniently carried in a gimbal fitting, such as described in the specification of co-pending application Serial No. 705,286 filed October 24, 1946, issued April 27, 1948 as Patent No. 2,440,403 from a plate member 18 supported from the rear wall 2 of the tube, screws 19 being provided for adjusting the position of the focussing coil 17. The yoke of the deflector coils 16 is mounted on a rotatable brass cylinder 20, operable from outside the plate 18, in order that the position of the deflector coils may be adjusted.

The front end of the tube envelope is closed by the glass plate 21 which is carried in the metal ring 21a and clamped by bolts 22 to the ring 23 secured to the open end of the cylinder 1, an annular sealing gasket 24 being provided for effecting a vacuumtight seal between the glass and the ring 23.

Within the tube envelope and just behind the glass plate 21 is arranged the target 25, comprising a part spherical metal plate coated on its curved surface with fluorescent material. The target 25 is detachably mounted upon the box casing 26 which is carried by radially disposed quartz supporting rods 27 from a ring 28 secured to the internal surface of the metal cylinder 1. Cooling fluid flows through a pipe 29 coiled in the box casing 26 for cooling the target 25, this cooling pipe being connected by tubing 30 to the outside of the chamber. This tubing 30, is preferably made of good insulating material, thus allowing oil of good insulating quality to be pumped through the coil 29 to cool the target.

Surrounding the re-entrant member 3 is the spherical Schmidt mirror 31, the outer periphery of which is mounted in a ring 32 carried by a plurality, for example three struts 33 from the ring 27. Collars 34 may be secured to the struts 33 at opposite sides of the ring 32, the front ends of the struts 33 being threaded and engaging with correspondingly threaded apertures in the ring 27 supporting the target 25. The rear ends of the struts 33 are provided with screw driver slots 35 which are accessible through removable sealing plugs 36 provided in the rear wall 2 opposite the ends of the struts 33. By turning the struts, the position of the mirror and the alignment of the mirror and target may be adjusted. The struts 33 are preferably made of a material having an extremely low coefficient of expansion, for example of the material known as Invar. It will be appreciated that with the construction described the mirror is spaced from the target by means which are separate from the tube envelope so that the special relationship between the target and the mirror are unaffected by evacuation shrinkage of the tube envelope upon the latter being evacuated.

The target 25 is electrically connected to the final anode of the electron gun by a plurality of thin wires 37 extending in conical fashion from spaced points around the periphery of the target to the mouth of the glass tube 1 and thence to the final anode of the gun 11. The wires should be sufficiently spaced to avoid, as much as possible, intercepting the light reflected from the fluorescent screens.

The thin correcting plate 40 is carried in a mounting ring 41 in front of the glass plate 21 by metal struts 42 carried from the ring 21a. The ring 41 is adjustable along these struts, being locked in adjusted position by the set screws 39. The correcting plate 40 is adjustable laterally within its mounting ring 41.

The complete projection tube is, as shown in Fig. 2, carried by a framework 50 which is preferably mounted on wheels 51 so as to be movable towards and away from the projection screen for focussing purposes. The envelope 1 is fixed to the framework 50, for example by means of the saddle members 52. Two of the struts 42 spacing the corrector plate 40 from the glass front of the envelope are each provided with a pair of rollers 53 carried by downwardly depending brackets 54, which rollers are adapted to run on a pair of rails 55 so that the complete assembly comprising the corrector plate 40 and front glass 21 with their respective mounting rings can, when the bolts 22 are undone, be rolled bodily away from the front of the envelope 1 to enable access to the interior to be obtained.

During operation the projection tube is continuously evacuated by means of appropriate pumping apparatus 56 which may be carried by the framework 50. The pump motor may also drive the pump for circulating cooling fluid through the pipe 30. The time base circuits and other electronic apparatus for operating the tube may be contained in a cabinet 57 arranged at the rear of the framework 50 the control knobs and indicators therefor and for the evacuating apparatus being arranged on the panel 58.

The envelope 1 is provided with a window 59 arranged at the end of a short tubular extension 60 projecting from the envelope 1 and so directed that the operator can see the target 25 through the window 59 for focussing purposes. A step ladder 61 carried by the framework 50 is provided for enabling the operator to mount to a convenient height to look through the window 59.

Whilst a particular embodiment has been described, it will be understood that various modifications can be made without departing from the scope of the invention as defined by the appended claims, for example, particularly for smaller apparatus, the entire tube envelope may be made of glass.

I claim:

1. Television projection tube comprising an envelope having a transparent wall portion, a fluorescent screen positioned within said envelope and directed away from said transparent wall portion, a Schmidt mirror having an aperture in the centre thereof positioned within the envelope to reflect light from the fluorescent screen through the transparent wall portion, a re-entrant portion of said envelope which passes through the aperture in the centre of the Schmidt mirror, a neck portion extending outwardly from the inner end of the re-entrant portion, said neck portion being aligned with the fluorescent screen and enclosing an electron gun positioned to scan said fluorecsent screen, and focussing and deflecting means disposed around the said neck portion and within said reentrant portion.

2. Television projection tube comprising an envelope having a transparent wall portion, a fluorescent screen positioned within said envelope and directed away from said transparent wall portion, a Schmidt mirror having an aperture in the centre thereof positioned within the envelope to reflect light from the fluorescent screen through the transparent wall portion, a re-entrant portion of said envelope which passes through the aperture in the centre of the Schmidt mirror, a neck portion extending outwardly from the inner end of the re-entrant portion, said neck portion being aligned with the fluorescent screen and enclosing an electron gun positioned to scan said fluorescent screen, focussing and deflecting means disposed around the said neck portion and within said re-entrant portion, and means for adjusting the position of the Schmidt mirror relative to the fluorescent screen.

3. Television projection tube comprising an envelope having a transparent wall portion, a conductive target having a fluorescent coating positioned within said envelope and directed away from said transparent wall portion, a Schmidt mirror having an aperture in the centre thereof positioned within the envelope to reflect light from the fluorescent target, through the transparent wall portion, a re-entrant portion of said envelope which passes through the aperture in the centre of the Schmidt mirror, a neck portion extending outwardly from the inner end of the re-entrant portion, said neck portion being aligned with the fluorescent target and enclosing an electron gun positioned to scan said fluorescent target, focussing and deflecting coils disposed around the said neck portion and within said re-entrant portion, and a plurality of spaced conductors extending from the periphery of the conductive target and connecting the target to the final anode of the gun.

4. Television projection apparatus comprising an envelope constituted by a metal cylinder closed at one end by a transparent plate carried in a removable mounting ring and at the other end by a metal plate having a re-entrant portion extending inwardly at the centre thereof, and a neck portion extending outwardly from the inner end of the re-entrant portion in the direction of the axis of the envelope, an electron gun mounted within said neck portion, focussing and deflecting coils surrounding said neck portion and disposed within the re-entrant portion, a Schmidt mirror having an aperture in its centre mounted within the envelope and surrounding said re-entrant portion, a target having a convex surface coated with fluorescent material positioned within the envelope facing the mirror and disposed so as to be scanned by the electron beam from said electron gun, and a correcting plate adjustably carried from the mounting ring for the transparent plate.

5. Television projection apparatus comprising an envelope constituted by a metal cylinder closed at one end by a transparent plate and at the other end by a metal plate having a re-entrant portion extending inwardly at the centre thereof, a neck portion extending outwardly from the inner end of the re-entrant portion in the direction of the axis of the envelope, an electron gun mounted within said neck portion, focussing and deflecting coils surrounding said neck portion and disposed within the re-entrant portion, a target having a convex surface coated with fluorescent material supported within the envelope so as to be scanned by the electron beam from said electron gun, a Schmidt mirror having an aperture in its centre surrounding said re-entrant portion, means comprising a plurality of struts having a low coefficient of expansion for supporting the mirror from the target supporting means, and means for adjusting the position of said mirror relative to said target.

6. Apparatus as claimed in claim 4, wherein a glazed window is provided in one of the metal walls of the envelope through which the target may be viewed.

7. Television projection tube as claimed in claim 1, comprising also means separate from the envelope for spacing the mirror from the fluorescent screen.

8. Television projection apparatus comprising an envelope constituted by a metal cylinder closed at one end by a transparent plate and at the other end by a metal plate having a re-entrant portion extending inwardly at the centre thereof, a neck portion extending outwardly from the inner end of the re-entrant portion in the direction of the axis of the envelope, an electron gun mounted within said neck portion, focussing and deflecting coils surrounding said neck portion and disposed within the re-entrant portion, a target having a surface coated with fluorescent material supported within the envelope so as to be scanned by the electron beam from said electron gun, and a Schmidt mirror having an aperture in its centre surrounding said re-entrant portion.

9. Apparatus as claimed in claim 8, wherein the re-entrant portion comprises a coned metal member having an outwardly extending flange around its larger end, said member being inserted through an aperture in the metal plate and having its flange secured and sealed to the portion of the metal plate surrounding the said aperture.

10. Apparatus as claimed in claim 9, in which the small diameter end of the conical re-entrant member is inwardly flanged to form an opening through which a tube of insulating material, forming the neck portion, extends and is secured in a vacuum-tight manner.

11. Apparatus as claimed in claim 10, wherein the open end of the re-entrant portion is provided with a support member through which the neck portion projects, said support member carrying the focus coil which is arranged within the re-entrant portion.

12. Apparatus as claimed in claim 11, wherein the deflecting coils are positioned around the neck portion and on the side of the focus coil remote from the support member, the yoke of the deflecting coils being connected with a cylinder of non-magnetic material which extends through the core opening of the focus coil and through the support member, whereby the deflector coil can be adjusted from outside the support member.

13. Apparatus as claimed in claim 5, wherein the struts supporting the mirror from the target supporting means are screw-threaded into one of these two parts, apertures closable by plugs being provided in the metal end plate of the envelope through which an implement can be inserted into the envelope for rotating the struts and adjusting the position of the mirror relative to the target.

BADEN JOHN EDWARDS.

REFERENCES CITED

The following references are of record in the file of this patent:

UNITED STATES PATENTS

| Number | Name | Date |
|---|---|---|
| 2,027,386 | Krummer | Jan. 14, 1936 |
| 2,241,974 | Anderson et al. | May 13, 1941 |
| 2,273,801 | Landis | Feb. 17, 1942 |
| 2,305,855 | Epstein et al. | Dec. 22, 1942 |
| 2,415,211 | Law | Feb. 4, 1947 |

FOREIGN PATENTS

| Number | Country | Date |
|---|---|---|
| 23,866/35 | Australia | Aug. 8, 1935 |
| 463,891 | Great Britain | Apr. 8, 1937 |
| 487,241 | Great Britain | June 16, 1938 |
| 557,771 | Great Britain | Dec. 3, 1943 |
| 617,226 | Germany | Aug. 2, 1927 |
| 841,458 | France | May 22, 1939 |

OTHER REFERENCES

"Projection Television," Journal of the Society of Motion Picture Engineers, vol. 44, No. 6 (June 1945), pp. 443–445. Copy in Div. 16.